US009110454B2

(12) United States Patent
Bharwani (10) Patent No.: US 9,110,454 B2
(45) Date of Patent: Aug. 18, 2015

(54) MACHINE DETECTION SYSTEM (71) Applicant: Caterpillar Inc., Peoria, IL (US)

(72) Inventor: Kiran Kumar Ram Bharwani, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 374 days.

(21) Appl. No.: 13/767,162

(22) Filed: Feb. 14, 2013

(65) Prior Publication Data

US 2014/0228982 A1 Aug. 14, 2014

(51) Int. Cl.
G06F 19/00 (2011.01)
G05B 19/18 (2006.01)
E02F 9/26 (2006.01)
B60W 30/08 (2012.01)

(52) U.S. Cl.
CPC ............... *G05B 19/18* (2013.01); *B60W 30/08* (2013.01); *E02F 9/26* (2013.01)

(58) Field of Classification Search
CPC ........... G05B 19/18; B60W 30/08; E02F 9/26
USPC ........................................................ 700/255
See application file for complete search history.

(56) References Cited

U.S. PATENT DOCUMENTS

| 5,646,844 | A * | 7/1997 | Gudat et al. .................. 701/409 |
| 5,913,919 | A * | 6/1999 | Bauer et al. .................. 701/301 |
| 6,173,215 | B1 * | 1/2001 | Sarangapani ................. 700/255 |
| 7,019,668 | B2 * | 3/2006 | Kinugawa ................ 340/870.16 |
| 7,603,235 | B2 * | 10/2009 | Makela et al. ................. 701/301 |
| 8,144,000 | B2 * | 3/2012 | Darby et al. ................... 340/435 |
| 8,477,021 | B2 * | 7/2013 | Slack .............................. 340/435 |
| 2009/0043462 | A1 * | 2/2009 | Stratton et al. .................. 701/50 |
| 2011/0268247 | A1 | 11/2011 | Shedlock et al. |
| 2013/0038320 | A1 * | 2/2013 | Frederick ................. 324/207.13 |

FOREIGN PATENT DOCUMENTS

RU 62083 3/2007

OTHER PUBLICATIONS

Seraji, Homayoun, Bruce Bon, and Robert Steele. "Real-time collision avoidance for 7-DOF arms." Intelligent Robots and Systems, 1997. IROS'97., Proceedings of the 1997 IEEE/RSJ International Conference on. vol. 3. IEEE, 1997.*

(Continued)

*Primary Examiner* — Michael D Masinick
(74) *Attorney, Agent, or Firm* — Finnegan, Henderson, Farabow, Garrett & Dunner, LLP (57) ABSTRACT A method of mapping a machine having a work tool includes sensing an outer boundary of the machine and generating a first set of information indicative of the outer boundary of the machine, moving the work tool relative to the machine through substantially an entire range of motion of the work tool, and sensing an outer boundary of the work tool during movement of the work tool through substantially the entire range of motion. The method also includes generating a second set of information indicative of a location of the outer boundary of the work tool through substantially the entire range of motion, determining information indicative of a position of an object disposed proximate the machine, and determining whether the information indicative of the position of the object is included in either the first or second sets of information.

20 Claims, 2 Drawing Sheets

(56) References Cited

OTHER PUBLICATIONS

Greenspan, Michael, John Ballantyne, and Mike Lipsett. "Sticky and slippery collision avoidance for tele-excavation." Intelligent Robots and Systems, 1997. IROS'97., Proceedings of the 1997 IEEE/RSJ International Conference on. vol. 3. IEEE, 1997.*

Lipsett, M. G., and W. J. Ballantyne. "Using range vision for telerobotic control in hazardous environments." (1996).*

* cited by examiner

MACHINE DETECTION SYSTEM

TECHNICAL FIELD

The present disclosure relates generally to a detection system, and more particularly, to a detection system associated with a mobile machine.

BACKGROUND

Machines used in mine sites and other like worksites can be large, complex, and relatively difficult to operate. For example, such machines may include one or more operator stations where a machine operator may sit during operation of the machine. While such operator stations are typically located at a central location on the machine to provide the operator with as much visibility as possible, such operator stations are inevitably characterized by one or more blind spots. For example, due to the size of the machines used in mine sites and other like worksites, an operator sitting in an operator station may not be able to see objects located in close proximity to the front end, rear end, and/or sides of the machine. Such machines may also include one or more ladders, railings, chains, safety covers, engine compartments, and/or other like components that may further hinder operator visibility.

Additionally, such machines may include work tools and/or other like components configured to assist in removing, hauling, moving, and/or otherwise handling large quantities of earthen material at the worksite. Such material may include, for example, dirt, rocks, sand, pavement, and/or minerals typically associated with such worksites. Due to the size and maneuverability of the work tools connected to the machine, however, an operator sitting in an operator station may not be able to see objects located in close proximity to the work tool.

In order to mitigate the risks associated with such blind spots, worksite machines typically employ a detection system configured to sense objects located in close proximity to the machine. Such an exemplary system is disclosed in U.S. Patent Application Publication No. US 2011/0268247 to Shedlock et al. ("the '247 publication"). The '247 publication teaches a scanning apparatus including an X-ray detector system. The detector system is configured to scan the environment proximate the scanning apparatus in response to user input, and to generate an image of a scanned object.

While the scanning apparatus of the '247 publication may be configured to generate one or more images of various objects, such systems are not configured to address the blind spot problems described above. For example, in machines employing a machine detection system, a scanning apparatus similar to that described in the '247 publication may be positioned on top of the operator station and/or at various other locations on the machine. During calibration of these systems, the scanning apparatus may detect one or more of the ladders, railings, chains, safety covers, engine compartments, and/or other components of the machine described above. In order to avoid unnecessarily notifying the operator of such components during operation of the machine, one or more software-based filters may be created for use with the machine detection system. Such filters may, for example, define regions on or around the machine within which detection is not possible due to the location or configuration of the scanning apparatus. As is the case in the example above, such filters may also define regions on or around the machine within which detected objects will be intentionally ignored to avoid falsely alarming the operator.

For ease of configuration and calibration, machines of various types often employ the same (i.e., a general/universal) software-based filter for use in conjunction with such machine detection systems. This universal filter is designed to be larger than necessary to account for variations in the size, number, location, and/or configurations of the various components attached to worksite machines. Portions of the universal filter are also enlarged to account for variations in the size, number, type, range of motion, and/or configurations of the various different work tools used with such machines. As a result, the universal filter typically employed by such machine detection systems may avoid notifying the operator of machine components, fixtures, or work tools during operation. However, since such universal filters are not tailored to closely match the particular configuration of the machine on which the machine detection system is used, such universal filters lack a desirable level of sensitivity.

The disclosed systems and methods are directed to overcoming one or more of the problems set forth above and/or other problems of the prior art.

SUMMARY

In an exemplary embodiment of the present disclosure, a method of mapping a machine having a work tool includes sensing an outer boundary of the machine and generating a first set of information indicative of the outer boundary of the machine, moving the work tool relative to the machine through substantially an entire range of motion of the work tool, and sensing an outer boundary of the work tool during movement of the work tool through substantially the entire range of motion. The method also includes generating a second set of information indicative of a location of the outer boundary of the work tool through substantially the entire range of motion, determining information indicative of a position of an object disposed proximate the machine, and determining whether the information indicative of the position of the object is included in either the first or second sets of information.

In another exemplary embodiment of the present disclosure, a method of mapping a machine having a first work tool includes sensing, at a worksite, an outer boundary of the machine with a plurality of sensors located on the machine, generating a first set of information indicative of the outer boundary of the machine, and moving the first work tool relative to the machine through substantially an entire range of motion of the first work tool. The method also includes sensing, at the worksite, an outer boundary of the first work tool during movement of the first work tool through substantially the entire range of motion with at least one sensor of the plurality of sensors, and generating a second set of information indicative of a location of the outer boundary of the first work tool through substantially the entire range of motion. The method further includes forming, at the worksite, an electronic map associated with the machine based on the first and second sets of information. The map is indicative of the outer boundary of the machine, the outer boundary of the first work tool, and substantially the entire range of motion. The method also includes determining information indicative of a position of an object at the worksite, and determining whether the object is located within the map based on the information indicative of the position of the object.

In a further exemplary embodiment of the present disclosure, a machine includes a frame, at least one traction device configured to support the frame and propel the machine about a worksite, and a work tool operatively connected to the frame and configured to move, relative to the frame, through a range of motion. The machine also includes a sensor mounted on the machine. The sensor is configured to generate a first set of information indicative of an outer boundary of the machine and a second set of information indicative of a location of an outer boundary of the work tool through substantially the entire range of motion. The machine further includes a controller disposed on the machine and in communication with the sensor. The controller is configured to generate an electronic map associated with the machine based on the first and second sets of information. The map is indicative of the outer boundary of the machine, the outer boundary of the work tool, and substantially the entire range of motion.

DETAILED DESCRIPTION

Figure 1:
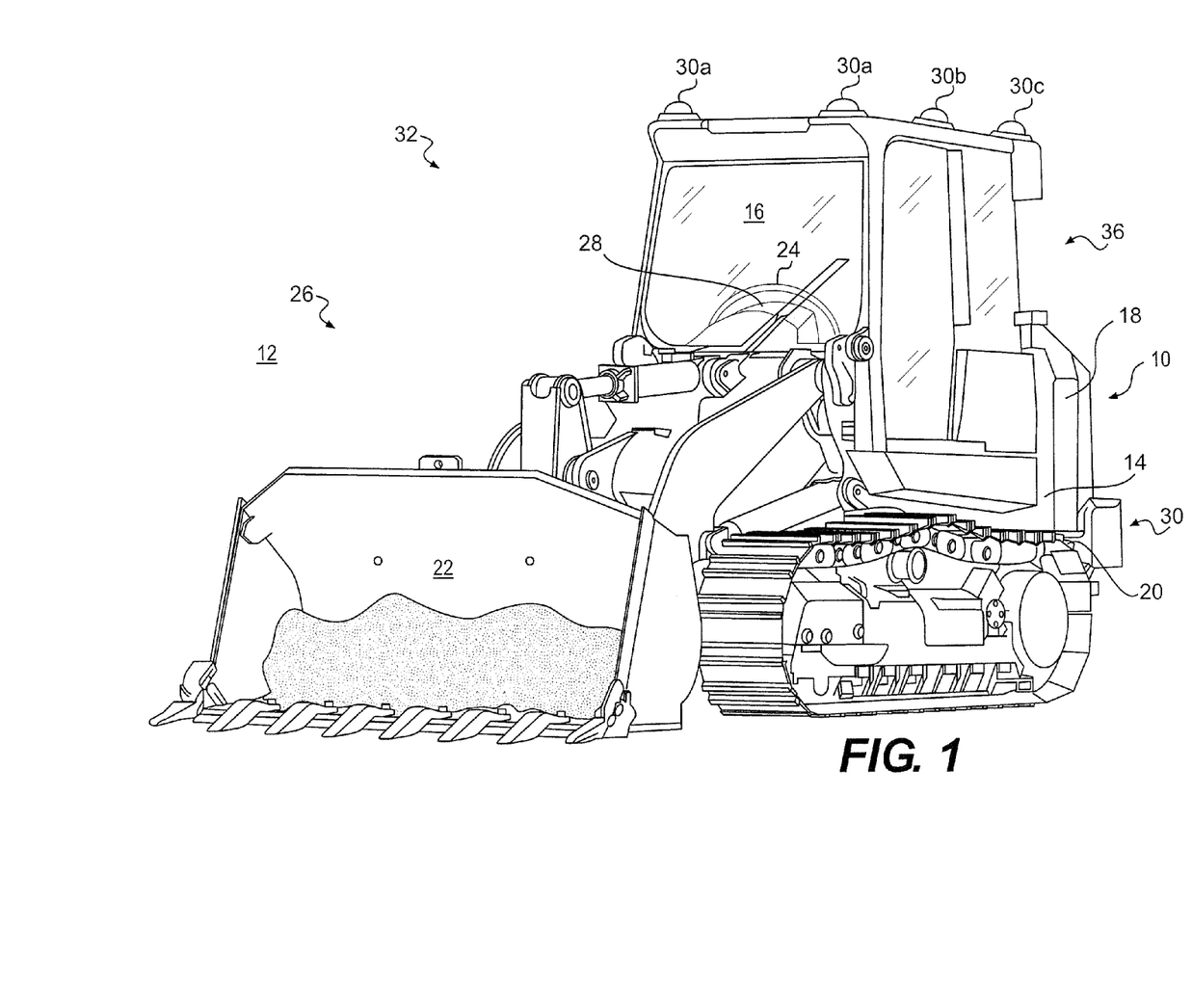
FIG. 1 is a diagrammatic illustration of an exemplary disclosed machine.

FIG. 1 illustrates an exemplary machine 10 operating at a worksite 12. Machine 10 may be a mobile machine that performs some type of operation associated with an industry such as mining, construction, farming, transportation, or any other industry known in the art. Exemplary operations include, among others, carrying, digging, dozing, hauling, ripping, grading, excavating, scraping, etc. Accordingly, machine 10 may be an earth moving machine such as a carry dozer (shown in FIG. 1), a scraper, a tractor, a wheel loader, a haul truck, a motor grader, or any other machine known in the art that is configured to move earthen material at worksite 12. Machine 10 may generally include a frame 14 that at least partially defines or supports an operator station 16, one or more engines 18 mounted to frame 14, a plurality of traction devices 20 driven by engine 18 to propel machine 10, and one or more work tools 22 operatively connected to frame 14 and powered by engine 18.

Operator station 16 may be equipped with one or more interface devices 24 located proximate an operator seat (not shown) and configured to exchange information (e.g., performance data, worksite records, control commands, etc.) with an operator of machine 10. These interface devices 24 may include, among other things, a monitor, a joystick, a pedal, a keypad, a button, a wheel, a lever, and/or any other device known in the art. Interface devices 24 may be configured to generate and receive signals corresponding with the information exchange.

In the exemplary embodiment of FIG. 1, one of interface devices 24 may include a monitor that provides a graphics user interface (GUI) for presentation of worksite information. The monitor may be a computer console or cab-mounted monitor, an LCD screen, a plasma screen, or another similar device that receives instructions and displays corresponding information. It is contemplated that the monitor may also be configured to receive input from the operator regarding desired modes and/or display functionality, for example by way of a touch screen interface or physical buttons and switches, if desired. Such monitors may be configured to display, for example, one, two, and/or three-dimensional images.

Engine 18 may be an internal combustion engine configured to combust a mixture of fuel and air to produce a mechanical power output. For example, engine 18 may include a diesel engine, a gasoline engine, a gaseous fuel-powered engine, or another type of combustion engine apparent to one skilled in the art. It is contemplated, however, that engine 18 may alternatively embody a non-combustion source of power such as a fuel cell, a battery, a tether cable, or another source known in the art.

Traction devices 20, in the disclosed embodiment, are tracks located at opposing sides 36 of machine 10. Each track may be independently driven to turn machine 10 or simultaneously and dependently driven to propel machine 10 in a straight direction. It is contemplated that one or all of traction devices 20 may be replaced with another type of traction device, if desired, such as belts or wheels. In these situations, steering of machine 10 may be implemented by pivoting and/or tilting the traction devices, as is known in the art.

Work tool 22 may be supported by frame 14, powered by engine 18, and controllable and/or monitored via interface devices 24. Work tool 22 may include any device used to perform a particular task such as, for example, a bucket (shown in FIG. 1), a blade, a fork arrangement, a shovel, a dump bed, or any other task-performing device known in the art. Although connected to a front end 26 of machine 10 in the embodiment of FIG. 1 to lift, pivot, and/or tilt relative to machine 10 and/or frame 14, work tool 22 may alternatively or additionally rotate, slide, extend, or move in another manner known in the art. In further exemplary embodiments, one or more additional work tools 22 may also be connected to a rear end 30 and/or at least one of the sides 36 of machine 10 for such movement.

One or more sensors 30a, 30b, 30c may be associated with machine 10 and/or work tool 22 to sense one or more characteristics thereof. In the depicted example, two sensors 30a are associated with front end 26 of machine 10, an additional sensor 30b is associated with side 36 of machine 10, and at least one sensor 30c is associated with rear end 30. In additional exemplary embodiments, any number or combination of sensors 30a, 30b, 30c may be disposed proximate and/or otherwise associated with front end 26, rear end 30, and one or both sides 36 of machine 10. Sensors 30a, 30b, 30c may embody a camera, a radar device, thermal radiation detectors, optical radiation detectors, and/or any other sensors known in the art. In exemplary embodiments, sensors 30a, 30b, 30c may be configured to generate an image of the portion of the machine 10 with which the respective sensor 30a, 30b, 30c is associated. For example, sensors 30a disposed proximate front end 26 may each be configured to generate an image of, sense, monitor, collect radiation in the optical and/or thermal band, and/or otherwise determine a characteristic associated with front end 26. In exemplary embodiments, such characteristics may comprise characteristics of and/or associated with worksite 12. For example, sensors 30a, 30b, 30c may each be configured to determine the presence and/or location of one or more objects 40 (FIG. 2) associated with the worksite 12 and positioned proximate machine 10. For example, sensors 30a, 30b, 30c may be configured to determine the presence and/or location of an operator, another machine 10, a large boulder or other impediment, and/or other objects 40 typically present at worksite 12 and proximate machine 10. It is also contemplated that images produced and/or other information collected by sensors 30a, 30b, 30c may be used to help determine the identification of such objects 40, if desired. For example, a particular color, size, shape, and/or other characteristic of the object, as determined by one or more of the sensors 30a, 30b, 30c, may be processed by a controller 28 in communication with sensors 30a, 30b, 30c to determine the identification thereof. It is contemplated that additional and/or different sensors may be associated with machine 10, if desired, and one or more of sensors 30a, 30b, 30c may be of a different type and/or configuration than a remainder of the sensors 30a, 30b, 30c employed by machine 10.

In further exemplary embodiments, sensors 30a, 30b, 30c may be configured to sense an outer boundary of machine 10 and/or work tool 22. In such embodiments, sensors 30a, 30b, 30c may be configured to generate one or more sets of information indicative of the outer boundary of machine 10 and indicative of the outer boundary of work tool 22. Such information may comprise distance, angle, rotation, speed, direction, acceleration, deceleration, and/or other like information typically associated with a machine 10 and/or a work tool 22. As used herein, the term "outer boundary" may be defined as the outermost surface of the object in question. Accordingly, the outer boundary of machine 10 may include the outer surface of frame 14, operator station 16 and/or one or more work tools 22 connected thereto. The outer boundary of machine 10 may also include the outer surface of any signage, ladders, railings, safety covers, walkways, steps, and/or other components of machine 10. Similarly, the outer boundary of work tool 22 may include the outer surface thereof as well as any blades, ground engaging tools, brackets, linkages, hydraulic actuation devices, pneumatic actuation devices, and/or any other components of work tool 22.

In exemplary embodiments, a first set of information may be indicative of the outer boundary of machine 10, and may include, for example, information indicative of a position of one or more machine components. Additionally, a second set of information may be indicative of the outer boundary of work tool 22, and may include, for example, information indicative of a position of work tool 22 relative to machine 10. In exemplary embodiments in which work tool 22 is configured to move relative to machine 10, such a second set of information may include information indicative of a location of the outer boundary of work tool 22 through substantially an entire range of motion of work tool 22. It is understood that various different work tools 10 may be connected to machine 10 during use to assist in accomplishing associated tasks at work site 12. Accordingly, upon replacing a first work tool 22 with a second work tool 22 different than the first, sensors 30a, 30b, 30c may be configured to generate respective sets of information indicative of the outer boundary of the second work tool 22.

In each of the embodiments described herein, sensors 30a, 30b, 30c may each be configured to determine the presence, position, and/or location of one or more components of machine 10 and/or work tool 22. For example, sensors 30a, 30b, 30c may each generate a respective subset of information unique to the sensor. In exemplary embodiments, the sets of information described above may comprise such respective subsets of information. Each subset of information may include information generated by the respective sensor indicative of a position of one or more machine components as seen by the respective sensor. For example, a first sensor 30a disposed proximate front end 26 may generate a first subset of information indicative of a position of a railing of machine 10. A second sensor 30a disposed proximate front end 26 but spaced from the first sensor 30a may generate a second subset of information indicative of a position of the railing as seen by the second sensor 30a. Although first and second sensors 30a may be configured to sense an outer boundary of machine 10 and generate respective subsets of information including information indicative of the position of the same railing or other machine component, the position information in the respective subsets may be different due to the different positions of the first and second sensors 30a relative to the railing. In further exemplary embodiments, each subset of information may include information generated by the respective sensors 30a, 30b, 30c indicative of a position of one or more objects 40 located at worksite 12 as seen by the respective sensor.

Controller 28, together with interface device 24 and sensors 30a, 30b, 30c may constitute a machine detection system 32 configured to generate and/or otherwise form, at worksite 12, one or more narrowly-tailored electronic maps 34 (FIG. 2) particular to machine 10. Controller 28 may embody a single or multiple microprocessors, field programmable gate arrays (FPGAs), digital signal processors (DSPs), etc., that are capable of analyzing input information received from sensors 30a, 30b, 30c and responsively generating and updating one or more electronic maps 34 based on the analysis. Numerous commercially available microprocessors can be configured to perform the functions of controller 28. It should be appreciated that controller 28 could readily embody a microprocessor separate from that controlling other functions of machine 10 and worksite 12, or that controller 28 could be integral with a general machine and/or worksite microprocessor and be capable of controlling numerous machine and/or worksite functions and modes of operation. If a separate microprocessor, controller 28 may communicate with the general machine and/or worksite microprocessor(s) via datalinks, wireless communications, or other methods. Various other known circuits may be associated with controller 28, including power supply circuitry, signal-conditioning circuitry, actuator driver circuitry (i.e., circuitry powering solenoids, motors, or piezo actuators), and communication circuitry.

Figure 2:
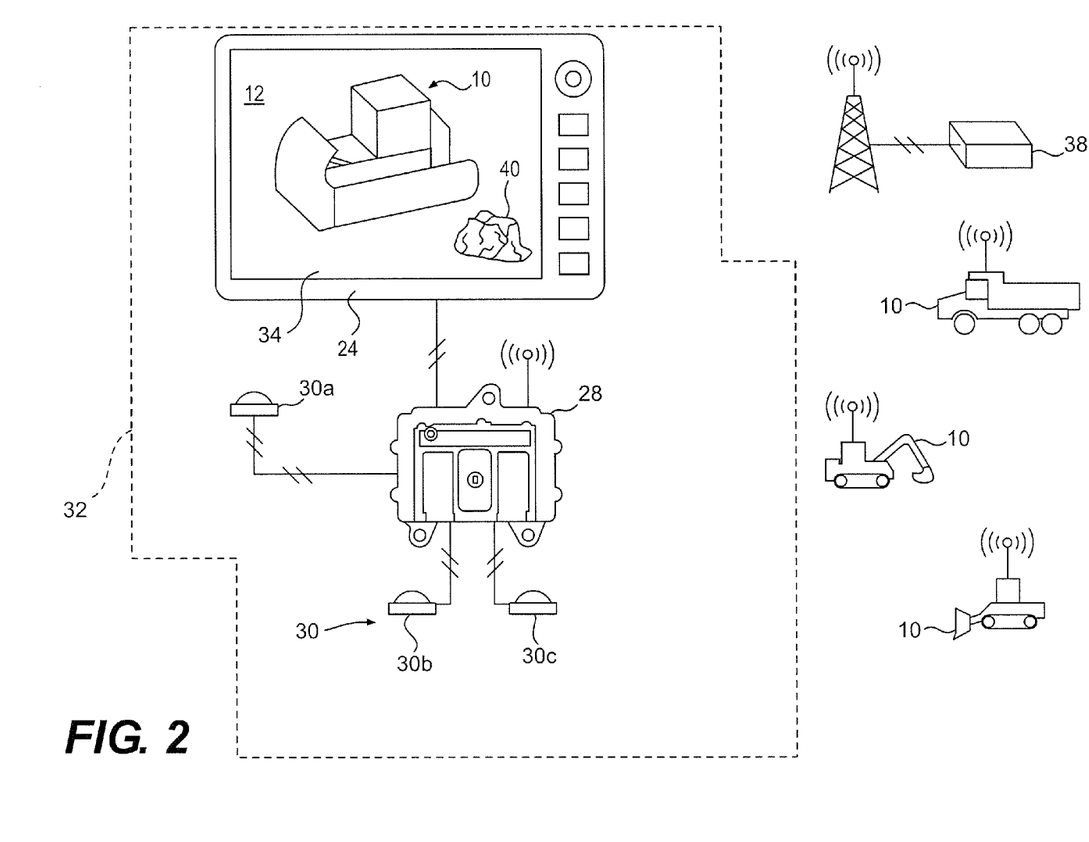
FIG. 2 is a schematic illustration of an exemplary detection system that may be used with the machine of FIG. 1.

Electronic map 34 may be stored in the memory of controller 28 and selectively displayed on interface device 24. Electronic map 34 may include a collection of data in the form of tables, graphs, and/or equations. For example, electronic map 34 may comprise a two or three-dimensional map associated with machine 10 and based on one or more sets and/or subsets of information received from sensors 30a, 30b, 30c. In such embodiments, electronic map 34 may be indicative of the outer boundary of machine 10, the outer boundary of work tool 22, and/or substantially an entire range of motion of work tool 22 relative to machine 10. Electronic map 34 may comprise a two-dimensional graphical representation of worksite 12 and/or machine 10. Additionally, as shown in FIG. 2, electronic map 34 may comprise a three-dimensional graphical representation of worksite 12 and/or machine 10, with locations and/or positions of respective machine components, work tool 22 and/or one or more objects 40 marked on the representation. Controller 28 may be configured to automatically generate and/or update electronic map 34, in real time during operation of machine 10. Alternatively, as will be described in greater detail below, controller 28 may be configured to form electronic map 34, at worksite 12, during calibration of machine 10 prior to operation. Controller 28 may also be configured to allow the operator of machine 10 to directly modify electronic map 34 and/or to select display parameters from available parameters stored in the memory of controller 28. It is contemplated that the modifications and/or display parameters may additionally or alternatively be automatically implemented and/or selectable based on modes of machine calibration and/or operation, if desired.

In one embodiment, controller 28 may be located onboard machine 10. In this embodiment, controller 28 may receive direct input from sensors 30a, 30b, 30c also located onboard machine 10 and may cause electronic map 34 to be displayed locally on interface device 34. It is contemplated that, in this embodiment, controller 28 may also be configured to communicate information obtained from sensors 30a, 30b, 30c and/or associated with the analysis performed by controller 28 offboard machine 10 to, for example, a worksite base station 38 or a general site controller (not shown) located at base station 38. This information may then be analyzed at base station 38 and/or forwarded to other machines 10 operating at worksite 12. In this manner, electronic map 34 may be the compilation of data simultaneously obtained from multiple sources at multiple locations within worksite 12.

In another embodiment, controller 28 could be the general site controller located at base station 38. That is, it may be possible that the information obtained from locating device 26 and sensor 30 is only analyzed and used to generate electronic map 34 at base station 38. In this situation, electronic map 34 could then be communicated to each machine 10 operating at worksite 12. It may also be possible for controller 28 to then, for example, provide an alarm to an operator of the one or more machines 10 operating at worksite 12. Such an alarm may indicate that machine 10 may be approaching or may be located proximate object 40. Such objects 40 may be located in a blind spot of one or more such machines 10 and the operators may not be aware of the presence of such objects. Alerting such operators as to the presence and/or location of such objects 40 may enable the operators to avoid contacting the object 40 with the machine 10.

INDUSTRIAL APPLICABILITY

The disclosed machine detection system may be applicable to any worksite and usable with any material handling machine to generate and update an electronic map closely matching the outer boundary of machine 10 and/or the one or more work tools 22 connected thereto. Since the electronic maps 34 of the present disclosure are unique to the particular machine 10 and/or work tool 22, and are generated during a calibration exercise at the work site 12, such electronic maps 34 eliminate the need for generic machine maps sized, shaped, and/or otherwise configured for use with a broad range of machines and/or work tools. In particular, the individualized electronic maps 34 of the present disclosure maximize the sensitivity of the machine detection system 32 and provide for enhanced detection of objects located in machine blind spots. Whereas such objects are not easily seen by the operator and would not be detected by less sensitive generic machine maps, the electronic maps 34 of the present disclosure closely match the outer boundary of machine 10 and/or work tool 22 in order to enable reliable detection of such objects. As a result, the electronic maps 34 of the present disclosure reduce machine damage, and resulting downtime associated with machine repair, caused by inadvertent contact between machine 10 and such objects 40. Accordingly, the exemplary embodiments of the present disclosure may increase overall profitability of the worksite 12. Operation of machine detection system 32 will now be described in detail.

In an exemplary embodiment, an operator of machine 10 may perform a calibration exercise whereby one or more three-dimensional electronic maps 34 of machine 10 may be generated by machine detection system 32. During such a calibration exercise, machine 10 may be positioned at a substantially flat, substantially unoccupied location in worksite 12, such as a location remote from objects 40 having any substantial size. In exemplary embodiments, machine 10 may be positioned at a location in which no such objects 40 may be within a sensing range of sensors 30a, 30b, 30c. It is understood that such a "sensing range" may be defined as a two or three-dimensional zone or area associated with such sensors 30a, 30b, 30c, within which objects may be sensed and/or detected by one or more of sensors 30a, 30b, 30c. Objects 40 disposed outside of such a sensing range may not be detected by sensors 30a, 30b, 30c. While machine 10 is disposed at such a location, controller 28 may direct sensors 30a, 30b, 30c to sense the outer boundary of machine 10. As a result, sensors 30a, 30b, 30c may generate a first set of information indicative of the outer boundary of machine 10. For example, sensors 30a, 30b, 30c may generate distance, position, location, and/or other information indicative of the dimensions, contours, shapes, and/or other characteristics of the outer boundary. As described above, the outer boundary of machine 10 may include the outer boundary of work tool 22. In exemplary embodiments, each sensor 30a, 30b, 30c may generate a respective subset of information indicative of the outer boundary of machine 10, and as noted above, the first set of information may comprise such subsets of info nation particular to each sensor 30a, 30b, 30c. Sensors 30a, 30b, 30c may direct such information to controller 28 for analysis and/or storage in memory.

During such an exemplary calibration exercise, controller 28 may also direct sensors 30a, 30b, 30c to sense the outer boundary of work tool 22. In exemplary embodiments, operator may control work tool 22 to move relative to machine 10 through substantially an entire range of motion thereof. For example, an operator may control work tool 22 to move from the fully-lowered position shown in FIG. 1 to a fully-raised position. Operator may also control work tool 22 to pivot in, for example, the fore and aft directions relative to frame 14. In further exemplary embodiments in which a different work tool 22 is coupled to machine 10, different movement and/or ranges of motion may be used in such an exemplary calibration exercise. Sensors 30a, 30b, 30c may be controlled to sense the outer boundary of work tool 22 during such movement. Sensors 30a, 30b, 30c may also generate a second set of information indicative of the location of the outer boundary of work tool 22 as work tool 22 travels through substantially the entire range of motion described above. In this way, sensors 30a, 30b, 30c may generate distance, position, location, and/or other information indicative of the dimensions, contours, shapes, and/or other characteristics of the outer boundary of work tool 22 as the position of work tool 22 changes relative to machine 10. As described above, each sensor 30a, 30b, 30c may generate a respective subset of information indicative of the outer boundary of work tool 22, and the second set of information may comprise such subsets of information. Sensors 30a, 30b, 30c may direct such information to controller 28 for analysis and/or storage in memory. Further it is understood that this process may be repeated for all machine components disposed on an outer surface thereof and configured for controlled movement relative to frame 14 and/or machine 10 generally. In exemplary embodiments, such components may include one or more additional work tools 22.

Once sensing is complete, controller 28 may modify at least one of the first and second sets of information generated by sensors 30a, 30b, 30c, and/or at least one of the respective subsets of information described above, based on a predetermined threshold factor associated with the machine 10 and/or the work tool 22. Such a threshold factor may be, for example, a ratio, a percentage, an algorithm, and/or any other mathematical expression useful in tailoring the information generated by sensors 30a, 30b, 30c to the particular machine 10 and/or work tool 22 being used. For example, such a threshold factor may be a percentage sufficient to account for variations in the position of machine 10, work tool 22, and/or components thereof, caused by loading, movement, vibration, deflection, and/or other environmental factors associated with operating machine 10 at worksite 12. In such embodiments, modifying at least one of the first and second sets of information generated by sensors 30a, 30b, 30c based on the threshold factor may result in a scaled-up, enlarged, and/or otherwise "augmented" set of information. Such an augmented set of information may be indicative of a larger outer boundary of machine 10 than that sensed by sensors 30a, 30b, 30c during the initial stages of the calibration exercise. Such an augmented set of information may also be indicative of a larger outer boundary of work tool 22 and/or of the range of motion of work tool 22 than that sensed by sensors 30a, 30b, 30c during the initial stages of the calibration exercise. Accordingly, due to such modifications, the sets of information and/or subsets of information associated therewith may be indicative of a slightly larger machine 10 and/or work tool 22 than that actually sensed by sensors 30a, 30b, 30c.

In further exemplary embodiments, controller 28 may form, at worksite 12, a three-dimensional electronic map 34 associated with machine 10 based on the first and second sets of information described above. As shown in FIG. 2, the electronic map 34 may be indicative of the outer boundary of machine 10, the outer boundary of work tool 22, and/or substantially the entire range of motion traveled by work tool 22. In such embodiments, controller 28 may modify electronic map 34 based on the predetermined threshold factor described above. Accordingly, in exemplary embodiments, modifying the electronic map 34 may include generating an enlarged (i.e., a scaled-up) three-dimensional electronic map 34 indicative of a larger outer boundary of machine 10 than that sensed by sensors 30a, 30b, 30c during the initial stages of the calibration exercise. Such an enlarged electronic map 34 may also be indicative of a larger outer boundary of work tool 22 and/or of the range of motion of work tool 22 than that sensed by sensors 30a, 30b, 30c during the initial stages of the calibration exercise. Accordingly, due to such modifications, the enlarged electronic map 34 may be indicative of a slightly larger machine 10 and/or work tool 22 than that actually sensed by sensors 30a, 30b, 30c. The initial electronic map 34 and/or the enlarged electronic map 34 may be stored in a memory of controller 28, and either map 34 may be displayed at any time via the interface device 24. As described above, such electronic maps 34 may be unique to the particular machine 10 and/or work tool 22 in use at worksite 12.

Such calibration exercises may be repeated as often as necessary at worksite 12. For example, such calibration exercises may be repeated each time a new work tool 22 is coupled to machine 10. For example, a first work tool 22 may be replaced with a second work tool 22 of the same type or of a different type than the first work tool 22. Upon connecting the second work tool 22 to machine 10, the operator may move the second work tool 22, relative to machine 10, through substantially an entire range of motion of the second work tool 22. During this process, sensors, 30a, 30b, 30c may sense, at worksite 12, the outer boundary of the second work tool during movement thereof through its range of motion. Sensors, 30a, 30b, 30c may also generate a third set of information indicative of the location of the outer boundary of the second work tool 22 through substantially the entire range of motion thereof. Such information may be sent to controller 28 for analysis and/or storage. In exemplary embodiments, controller 28 may form, at worksite 12, a three-dimensional electronic map 34 associated with machine 10 and the second work tool 22. Such an electronic map 34 may be based on the first set of information described above and the third set of information particular to the second work tool 22. Thus, the new electronic map 34 may be unique to the second work tool 22. Further, the third set of information and/or the associated new electronic map 34 may be modified based on one or more threshold factors as described above.

During operation, machine 10 may encounter one or more objects 40 at worksite 12, and depending on the configuration of machine 10, such objects 40 may be not be visible by the operator of machine 10. For instance, such objects 40 may be located in one or more blind spots associated with machine 10 and/or operator station 16. In embodiments in which objects 40 comprise large boulders, other machines, work site equipment, and the like, contact between machine 10 and object 40 may cause unwanted damage to object 40 and/or machine 10. In other embodiments in which objects 40 comprise operators or other work site employees, such contact may result in harm or injury. Accordingly, machine detection system 32 may be operable to detect such objects 40 and alert the operator to the presence of such objects 40 in order to avoid inadvertent contact between such objects 40 and machine 10.

In exemplary embodiments, sensors, 30a, 30b, 30c may determine information indicative of a position of an object 40 disposed proximate machine 10 at worksite 12. For example, during operation of machine 10, sensors, 30a, 30b, 30c may detect one or more such objects 40 disposed within the sensing range of the respective sensors, 30a, 30b, 30c. Sensors, 30a, 30b, 30c may determine, for example, the position of object 40 relative to machine 10, and the information determined by sensors, 30a, 30b, 30c may comprise distance, angle, and/or other like information. Additionally, if object 40 is moving relative to machine 10, such information may comprise speed, acceleration, rotation, and/or other like information indicative of such movement. In each of the embodiments discussed herein, such information may be determined by sensors, 30a, 30b, 30c in real time, and in an open-loop and/or a closed-loop manner. Such information collected by sensors, 30a, 30b, 30c may be directed to controller 28 for storage and analysis. For example, controller 28 may determine whether the information indicative of the position of object 40 is included in either the first or second sets of information described above. Such an analysis may include determining whether the information indicative of the position of object 40 is included in any of the subsets of information particular to the respective sensors 30a, 30b, 30c. Further, in exemplary embodiments in which machine detection system 32 has formed a three-dimensional electronic map 34 associated with the machine 10, such an analysis may include determining whether object 40 is located within the electronic map 34.

Since the exemplary sensed outer boundaries and electronic maps 34 described herein closely match the actual outer boundary of machine 10 and work tool 22, such sensed outer boundaries and electronic maps 34 are useful for warning the operator of potential contact between machine 10 and object 40. For example, if controller 28 determines that the information indicative of the position of object 40 is encompassed by and/or otherwise included in the first or second sets of information, or any of the various respective subsets of information associated therewith, controller 28 may conclude that the sensed object 40 is actually part of machine 10 or work tool 22. Likewise, if controller 28 determines that the information indicative of the position of object 40 is encompassed by and/or otherwise included in the electronic map 34 generated based on the first or second sets of information, or any of the various respective subsets of information associated therewith, controller 28 may conclude that the sensed object 40 is actually part of machine 10 or work tool 22. In such embodiments, controller 28 may determine that the object 40 is located within the confines of the electronic map 34 based on the information indicative of the position of the object 40. Controller 28 may not provide an alarm to the operator of machine 10 in response to such determinations.

On the other hand, if controller 28 determines that the information indicative of the position of object 40 is not included in either the first or second set of information, and/or in any of the respective subsets of information associated therewith, controller 28 may, in response, direct one or more interface devices 24 to provide an audible, visual, tactile, and/or other like alarm to the operator of machine 10. Such an alarm may be indicative of a determination by controller 28 that the sensed object 40 is within a sensing range of one or more of sensors 30a, 30b, 30c, and is outside of the outer boundary of machine 10 and substantially the entire range of motion of work tool 22. In exemplary embodiments, such a sensing range may extend up to approximately 30 meters from the respective sensor 30a, 30b, 30c. In further exemplary embodiments, and depending on the configuration of the respective sensor 30a, 30b, 30c, such a sensing range may be greater than or less than approximately 30 meters. It is also understood that in exemplary embodiments in which machine detection system 32 forms a three-dimensional electronic map 34 associated with machine 10, controller 28 may direct one or more interface devices 24 to provide such an alarm to the operator in response to determining that object 40 is not located within the electronic map 34. The alarms described herein may assist the operator in avoiding contact between machine 10 and object 40. Additionally, since the outer boundaries and/or electronic maps 34 described herein are formed, at worksite 12, to closely match the particular contours, geometries, and/or other configurations of the respective machine 10 and work tool 22 in use, the outer boundaries and/or electronic maps 34 of the present disclosure are not plagued by the sensitivity and/or other deficiencies of universal software-based filters commonly employed by known machine detection systems.

It will be apparent to those skilled in the art that various modifications and variations can be made to the disclosed systems and methods. Other embodiments will be apparent to those skilled in the art from consideration of the specification and practice of the disclosed machine detection system 32. It is intended that the specification and examples be considered as exemplary only, with a true scope being indicated by the following claims and their equivalents.

What is claimed is:

1. A method of mapping a machine having a work tool, comprising:
    sensing an outer boundary of the machine and generating a first set of information indicative of the outer boundary of the machine;
    moving the work tool relative to the machine through substantially an entire range of motion of the work tool;
    sensing an outer boundary of the work tool during movement of the work tool through substantially the entire range of motion and generating a second set of information indicative of a location of the outer boundary of the work tool through substantially the entire range of motion;
    determining information indicative of a position of an object disposed proximate the machine; and
    determining whether the information indicative of the position of the object is included in either the first or second sets of information.

2. The method of claim 1, further including providing an alarm to an operator of the machine in response to determining that the information indicative of the position of the object is not included in either the first or second set of information.

3. The method of claim 1, wherein determining that the information indicative of the position of the object is not included in either the first or second sets of information comprises determining that the object is within a sensing range of a sensor associated with the machine, and is outside of the outer boundary of the machine and substantially the entire range of motion of the work tool.

4. The method of claim 3, wherein the sensor comprises one of a camera and a radar device.

5. The method of claim 1, further comprising modifying at least one of the first and second sets of information based on a predetermined threshold factor associated with the machine.

6. The method of claim 5, wherein modifying the at least one of the first and second sets of information results in an augmented set of information, the augmented set of information being indicative of at least one of a larger outer boundary of the machine than the sensed outer boundary of the machine and a larger outer boundary of the work tool than the sensed outer boundary of the work tool.

7. The method of claim 1, wherein at least one of the first and second sets of information is generated by a plurality of sensors associated with the machine, the at least one of the first and second sets of information comprising a subset of information associated with each respective sensor of the plurality of sensors.

8. The method of claim 7, wherein the subset of information associated with each respective sensor includes information indicative of a position of a component of the machine relative to one sensor of the plurality of sensors.

9. The method of claim 7, wherein determining whether the information indicative of the position of the object is included in either the first or second sets of information comprises comparing the information indicative of the position of the object to the subset of information associated with each respective sensor.

10. The method of claim 7, further including providing an alarm to an operator of the machine in response to determining that the information indicative of the position of the object is not included in the subset of information associated with each respective sensor.

11. A method of mapping a machine having a first work tool, comprising:
    sensing, at a worksite, an outer boundary of the machine with a plurality of sensors located on the machine;
    generating a first set of information indicative of the outer boundary of the machine;
    moving the first work tool relative to the machine through substantially an entire range of motion of the first work tool;
    sensing, at the worksite, an outer boundary of the first work tool during movement of the first work tool through substantially the entire range of motion with at least one sensor of the plurality of sensors;
    generating a second set of information indicative of a location of the outer boundary of the first work tool through substantially the entire range of motion;
    forming, at the worksite, an electronic map associated with the machine based on the first and second sets of information, wherein the map is indicative of the outer boundary of the machine, the outer boundary of the first work tool, and substantially the entire range of motion;
    determining information indicative of a position of an object at the worksite; and
    determining whether the object is located within the map based on the information indicative of the position of the object.

12. The method of claim 11, further including modifying the map based on a predetermined threshold factor associated with the machine.

13. The method of claim 12, wherein modifying the map comprises generating an enlarged map indicative of at least one of a larger outer boundary of the machine than the sensed outer boundary of the machine and a larger outer boundary of the first work tool than the sensed outer boundary of the first work tool.

14. The method of claim 11, wherein at least one of the first and second sets of information comprises a subset of information associated with each respective sensor of the plurality of sensors, the subset of information including information indicative of a position of a component of the machine relative to one sensor of the plurality of sensors.

15. The method of claim 11, further including determining that the object is not located within the map, and providing an alarm to an operator of the machine in response to determining that the object is not located within the map.

16. The method of claim 11, further including storing the map in a memory located on the machine.

17. The method of claim 11, further including replacing the first work tool with a second work tool different than the first work tool;
  moving the second work tool relative to the machine through substantially an entire range of motion of the second work tool;
  sensing, at the worksite, an outer boundary of the second work tool during movement of the second work tool through substantially the entire range of motion of the second work tool;
  generating a third set of information indicative of a location of the outer boundary of the second work tool through substantially the entire range of motion of the second work tool; and
  forming, at the worksite, an additional electronic map associated with the machine and the second work tool based on the first and third sets of information.

18. A machine, comprising:
  a frame;
  at least one traction device configured to support the frame and propel the machine about a worksite;
  a work tool operatively connected to the frame and configured to move, relative to the frame, through a range of motion;
  a sensor mounted on the machine and configured to generate a first set of information indicative of an outer boundary of the machine and a second set of information indicative of a location of an outer boundary of the work tool through substantially the entire range of motion; and
  a controller disposed on the machine and in communication with the sensor, the controller being configured to generate an electronic map associated with the machine based on the first and second sets of information, wherein the map is indicative of the outer boundary of the machine, the outer boundary of the work tool, and substantially the entire range of motion.

19. The machine of claim 18, wherein the controller is further configured to generate an enlarged electronic map based on a predetermined threshold factor associated with the machine, the enlarged map being indicative of at least one of an enlarged outer boundary of the machine and an enlarged outer boundary of the work tool.

20. The machine of claim 18, further comprising a plurality of sensors in communication with the controller, wherein at least one of the first and second sets of information comprises a subset of information associated with each respective sensor of the plurality of sensors, the subset of information including information indicative of a position of a component of the machine relative to one sensor of the plurality of sensors.

\* \* \* \* \*